US 6,678,039 B2

(12) United States Patent
Charbon

(10) Patent No.: US 6,678,039 B2
(45) Date of Patent: Jan. 13, 2004

(54) METHOD AND SYSTEM TO ENHANCE DYNAMIC RANGE CONVERSION USEABLE WITH CMOS THREE-DIMENSIONAL IMAGING

(75) Inventor: Edoardo Charbon, Berkeley, CA (US)

(73) Assignee: Canesta, Inc., San Jose, CA (US)

( * ) Notice: Subject to any disclaimer, the term of this patent is extended or adjusted under 35 U.S.C. 154(b) by 0 days.

(21) Appl. No.: 10/155,467

(22) Filed: May 23, 2002

(65) Prior Publication Data

US 2002/0176067 A1 Nov. 28, 2002

Related U.S. Application Data

(60) Provisional application No. 60/293,396, filed on May 23, 2001.

(51) Int. Cl.[7] .............................. B01C 3/08; B01S 13/08
(52) U.S. Cl. ................... 356/5.01; 342/135; 342/139; 342/145; 356/5.08
(58) Field of Search ............................ 356/5.01, 5.08, 356/14.1; 342/135, 139, 145

(56) References Cited

U.S. PATENT DOCUMENTS 4,277,167 A * 7/1981 Eppel
5,446,529 A * 8/1995 Stettner et al. ............ 356/4.01
5,682,229 A * 10/1997 Wangler ..................... 356/4.01
5,835,204 A * 11/1998 Urbach ....................... 356/5.01
5,898,484 A * 4/1999 Harris ........................ 356/4.01
6,137,566 A * 10/2000 Leonard et al. ........... 356/141.1
6,448,572 B1 * 9/2002 Tennant et al. ......... 250/559.38
6,456,368 B2 * 9/2002 Seo ............................ 356/5.01

* cited by examiner

Primary Examiner—Stephen C. Buczinski
(74) Attorney, Agent, or Firm—Michael A. Kaufman; Dorsey & Whitney LLP

(57) ABSTRACT

High dynamic range brightness information is acquired by inputting detection current to a high (adjustable) gain resettable integrator whose output V(t) is compared to a Vth threshold by a comparator whose output is counted by a reset counter as $V(t) \geq V_{th}$. When a desired count is attained, data acquisition ends, the counter is read, and the entire circuit is reset. A TOF data acquisition circuit includes first and second sequences of series-coupled delay units, and a like number of latch units coupled between respective delay units. A phase discriminator compares output from each chain and feedback a signal to one of the chains and to a comparator and can equalize delay through each chain. A control voltage is coupled to the remaining chain to affect through-propagation delay time. The latch units can capture the precise time when $V(t) \geq V_{th}$. Successive measurement approximation can enhance TOF resolution.

35 Claims, 6 Drawing Sheets

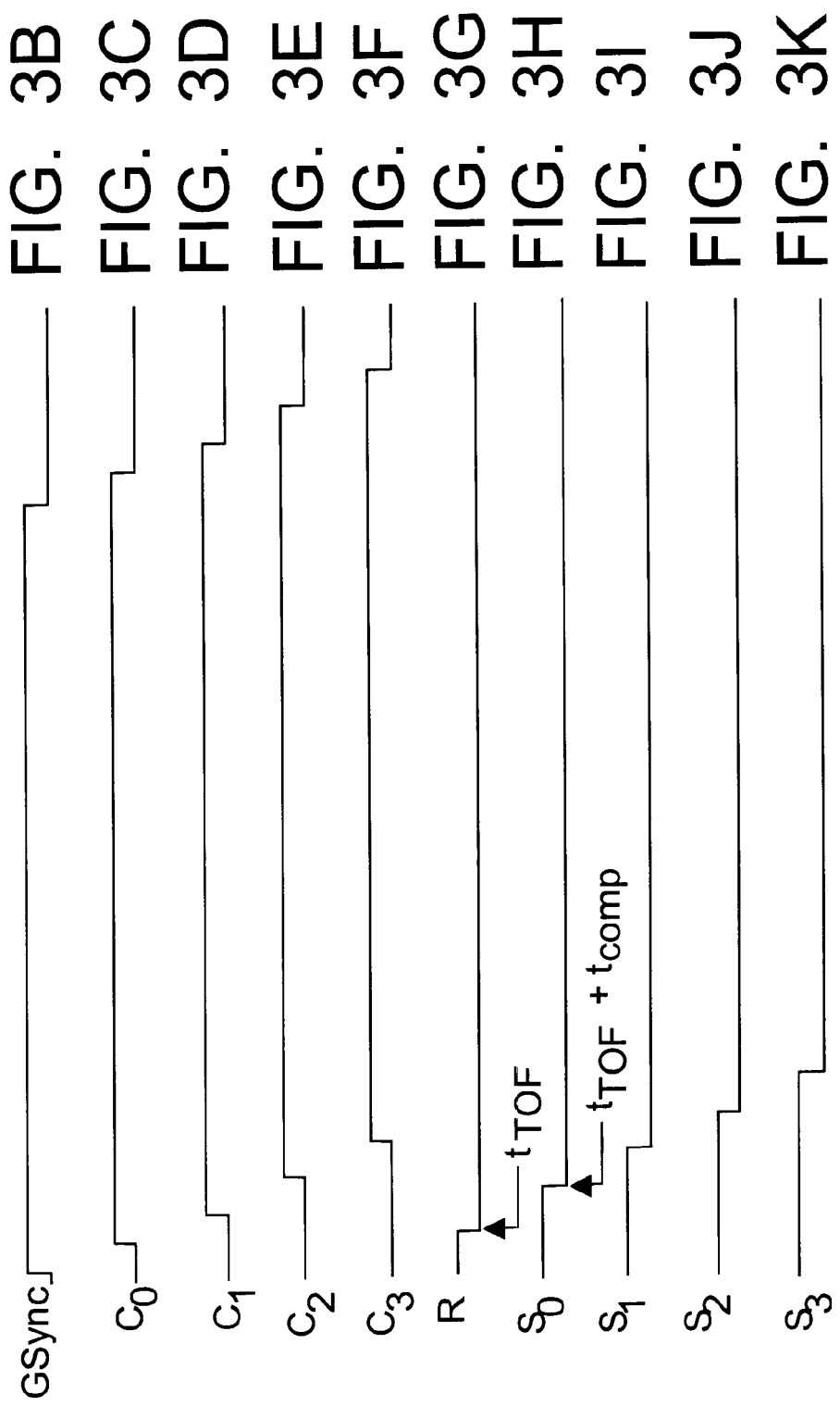

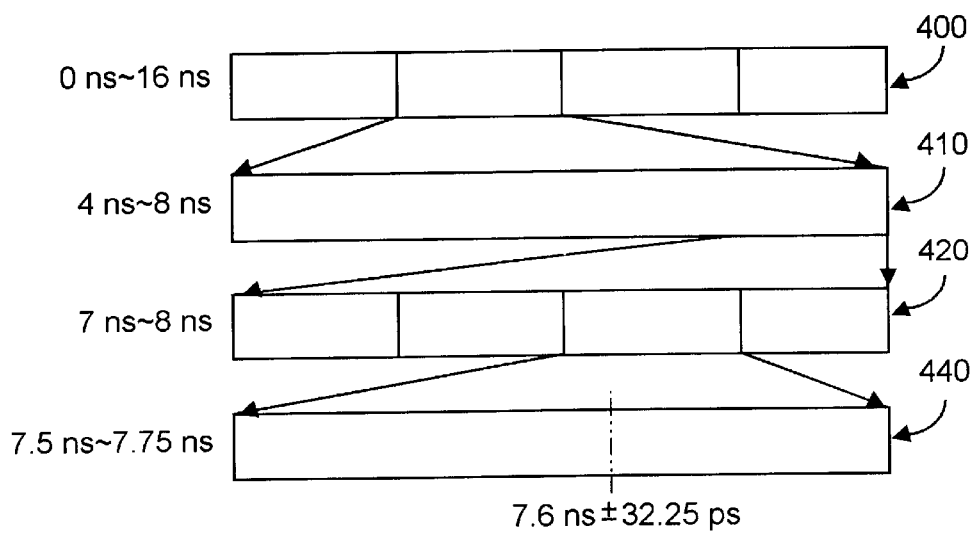
FIG. 4
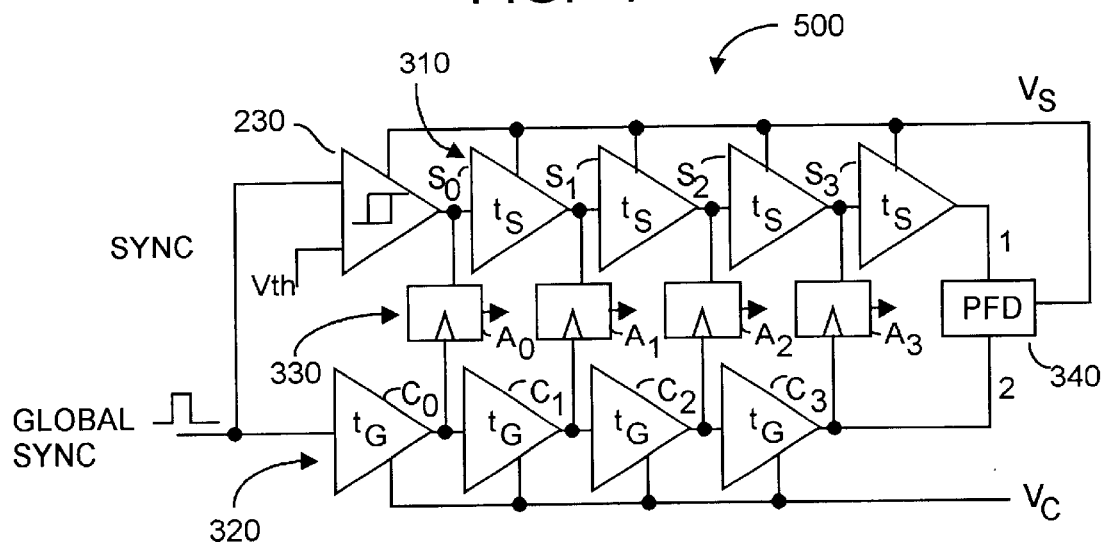
FIG. 5A
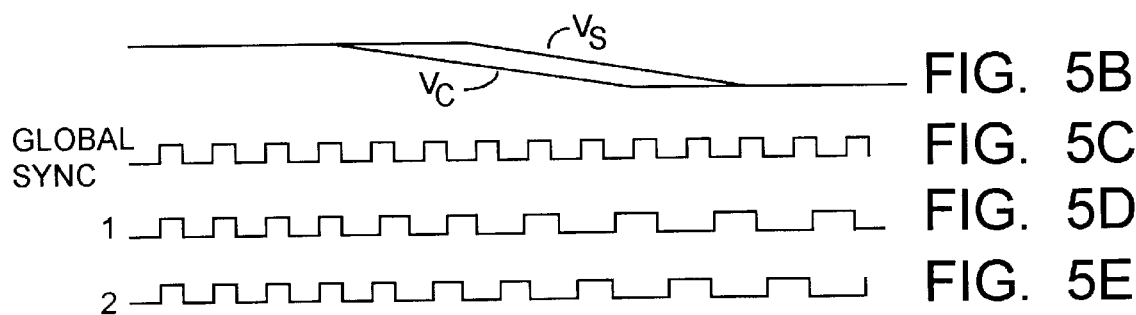
FIG. 5B
FIG. 5C
FIG. 5D
FIG. 5E

METHOD AND SYSTEM TO ENHANCE DYNAMIC RANGE CONVERSION USEABLE WITH CMOS THREE-DIMENSIONAL IMAGING

RELATIONSHIP TO PENDING APPLICATIONS

Priority is claimed from co-pending U.S. provisional patent application serial No. 60/293,396 filed May 23, 2001, entitled "High Dynamic Range Conversion Techniques for CMOS 3D Imaging". Applicant incorporates said application herein by reference.

FIELD OF THE INVENTION

This invention relates generally to processing data acquired from three-dimensional imaging systems, and more particularly to enhancing the dynamic range associated with data acquired from imaging systems using low-power sequential analog-to-digital conversion, distributed in space and time, including such systems implemented in CMOS.

BACKGROUND OF THE INVENTION

Imaging sensors are used in a variety of applications, including cameras, video, radar systems, and instrumentation. In generally, such sensors rely upon detection of electromagnetic (EM) energy, for example emitted energy that is reflected off of a target object and then detected.

Various techniques are used to detect EM energy, varying upon the application, the energy wavelength, and the desired speed of data acquisition. For example, in radar systems, EM waves are generally focused by a maze of waveguides and detected within a cavity using a diode that is sensitive to the frequency of interest.

In light and infrared (IR) imaging systems, EM waves that are reflected from a target object are collected by photodiode detectors in the form of a small photodiode current. This current can then be used to charge a relatively large capacitor over a long integration time period. After integration time ends, the signal voltage developed across the capacitor will eventually be read out, for example via sequential charge transfer as in charge coupled devices (CCDs). The signal voltage representing target objects farther away will be lower in general that the signal voltage representing nearby target objects.

An especially useful IR-type sensing application with which the present invention may (but need not) be practiced will now be described for background purposes. One form of IR-type sensing is so-called three-dimensional sensing and is described in U.S. Pat. No. 6,323,942 entitled "CMOS-Compatible Three-Dimensional Image Sensor IC" (2001), assigned to assignee herein. The '942 patent discloses the use of light emissions and measurements of partial energy reflected from a target a distance Z away to determine distance between such a sensor system and the target.

FIG. 1 depicts a generic IR image sensing system 10 such as that described in the '942 patent, a system that can determine distance Z between system 10 and a target object 20. Much of system 10 is implemented on a CMOS IC 30 that includes an array 40 of pixel detectors 50 (e.g., photodiodes), and dedicated electronics 60 preferably associated with each pixel detector. An optical energy emitter 70, e.g., a LED or laser diode, emits energy via a lens 80, some of which energy is reflected from the target object 20 and can be detected by at least some pixel detectors in array 40. (Emitter 70 may in fact be implemented off-IC 30.) Every pixel detector within the array captures the partial energy of the light being reflected by a point on the target's surface and thus captures the distance from the pixel detector to such point.

IC 30 includes a microprocessor or microcontroller unit 90, memory 100 (which preferably includes random access memory or RAM and read-only memory or ROM memory, and various input/output (I/O) and interface circuits, collectively 110. Microprocessor 90 controls operation of the energy emitter 70 and of the various electronic circuits within IC 30. Using various signal processing techniques, the time-of-flight (TOF) for optical energy to travel from system 10 to a point on target object 20 and be at least partially reflected back via an optional lens 120 to a pixel detector 50 within array 40 can be determined. This determination is often termed TOF acquisition. Since the speed of light is known, the distance Z associated with a given time measurement can be determined, e.g., perhaps time t1 is associated with a distance Z1, whereas a longer time t3 is associated with a more remote distance Z3, etc. One can construct a three-dimensional image of a target or scene by combining the data collected from every pixel in the array. Various raw data (DATA) can of course be exported off-IC for further and perhaps more extensive signal processing.

Within detector array 40, the measurement of incoming light energy reaching a given pixel detector is known as brightness acquisition. Various techniques for TOF acquisition and/or brightness acquisition useable in multi-dimensional image sensing exist. A very practical problem encountered with sensing systems, including those described above, is that the peak power of the light energy that is detected may vary by several orders of magnitude, e.g., representing information from a very dim surface point to representing information from a very bright surface point of the target object.

In imaging devices such as above-described, the ratio between the highest and lowest measurable EM energy is limited by the lowest detectable energy in the EM wave, and by the saturation voltage across the integration capacitor. The simultaneous detection of very dim and strong sources of light using the same mechanism is generally performed using two techniques, namely automatic gain control (AGC) and over-sampling.

On one hand, AGC techniques employ an automatic gain control preamplifier that adjusts amplifier gain level so as to keep the amplified photodiode signal within a predefined range. The readout data includes both the amplifier output and the gain value, and can be interpreted as the mantissa and exponent of the desired output signal. In various CCD device applications, AGC techniques have been developed to cope with dynamic ranges of about 35 dB.

On the other hand, over-sampling techniques include comparing the amplified signal with a pre-defined threshold, and resetting the signal and generating a pulse when the threshold is attained. Such generated pulses form a continuous stream of bits that can be coded onto digital words representing the amplified photodiode signal. This second technique is analogous to a class of over-sampling analog-to-digital converters (ADCs) known as sigma-delta (or delta-sigma) converters.

Acquisition of information detected by the pixel array 40 in FIG. 1 may be performed in two phases: a first phase directed to brightness acquisition, and a second phase directed to TOF acquisition.

In a first (brightness acquisition) phase, incoming pulses of light energy are captured by photodiodes or pixel detectors 50 within array 40, which detectors translate the photon energy into detector current. The detector current from each pixel can be integrated over a variable amount of time to create an output signal voltage pulse. Eventually the integrated voltage signal level reaches a given threshold, at which time the integration period ends and a logic pulse is generated for use in incrementing a logic counter. At the end of acquisition, the logic counter holds a logic state uniquely representing the total number of received logic pulses. The brightness of light at a given pixel is proportional to such state. This first phase is performed simultaneously and independently in a matrix array of N×M points of acquisition or pixels.

In a second (TOF acquisition) phase, the time delay between the energy pulse emitted by emitter 70 and the target-reflected received pulse detector within array 40 is automatically matched to a normalized value. The signal voltage associated with such value will be a measure of the TOF, which measure can be stored in the very same logic counter noted described above.

The logic counter-held digital content for each pixel in the array may be accessed sequentially or randomly, and the overall image detected by the array can subsequently be decoded and stored in local random access memories (RAMs), e.g., associated with memory 100 in FIG. 1. The RAM contents can then be uploaded to a personal computer or other device using standard communication links, e.g., wireless links, wired links, etc.

As noted above, reflected incoming energy may represent a very bright region of a target object, a very dim region, or a brightness level somewhere in between. Capturing such a large variation of brightness level information can present a challenge to circuit designers. Thus, techniques have been developed to cope with high dynamic range imaging, including the above-mentioned AGC and over-sampling techniques.

But in practice, AGC-based designs are inherently complex and generally significantly increase power dissipation per pixel detector. As a result, AGC-based techniques are difficult to replicate thousands or hundreds of thousands or more times for integration into a large array of pixel detectors. Due to its complexity, AGC is only practical if performed external to the pixel array, which constraint is undesirable because of the inherent speed limitations. Further, AGC requires extra circuitry for a calibration procedure that must be repeated frequently on a per-pixel basis.

As noted, over-sampling techniques are somewhat analogous to over-sampling A/D converters. But a huge stream of pulses is generated when the various pixel detector outputs exceed a threshold, which stream of pulses must be propagated external to the pixel array for collection and further signal processing. Unfortunately, having to propagate the pulse stream external to the pixel array typically creates a processing bottleneck, especially with respect to physically transmitting the content of each pixel externally to the array. While so-called winner-take-all schemes can help, the bottleneck problem remains. Even if propagation is performed on a pixel array column-by-column basis, several nanoseconds may be required for completion, and such process must be repeated for each pixel in the column. System speed performance is constrained not only by information propagation time, but by the number of rows and columns in the detection pixel array, which imposes a limitation on the size of the array.

What is needed is an improved method and system for coping with the high dynamic range encountered during acquisition of information, including two-dimensional data and three-dimensional data. Preferably signal processing techniques including analog/digital processing should be localized within the pixel array, and the conversion results stored for later access and signal processing. The method and system should enable detection of both bright and dim light signals with substantially the same resolution precision without having to readjust or change the mode of operation of the acquisition system. Preferably such method and system should permit re-using circuitry that is already in place in the system. Further, such method and system should be useable, even with very large pixel detection array sizes.

The present invention provides such a method and system.

SUMMARY OF THE INVENTION

In a first embodiment, a low noise, readily replicated circuit promotes a large dynamic range of acquired brightness information. Photodetector output I(t) current is input to a variable gain resettable integrator. The integrator output V(t) is input to a comparator for comparison to a threshold voltage Vth. When $V(t) \geq Vth$ the comparator changes state. A feedback loop from the comparator output to the bias source for the photodetector helps ensure that the comparator output is a time-lengthened pulse that is input for counting to a reset counter that may be implemented as a sequence chain of latches. Data acquisition ends when the counter attains a desired count and is read, whereupon the entire circuit is reset. Using a high integrator enables the circuit to respond to low amplitude input signals (e.g., dim light signals), whereas resetting the system when V(t) reaches Vth enables the circuit to respond well to large amplitude signals without saturating the integrator.

A second embodiment provides a TOF data acquisition delay locked loop circuit that advantageously can reuse much of the circuitry of the acquired brightness circuit. The TOF acquisition circuit provides a first sequence and a second sequence of series-coupled delay units, a like number of units being in each sequence (or chain). The circuit also includes a like number of latch units. The clock input of a latch unit is coupled to the output of an associated first sequence delay unit, and the data input of the latch unit is coupled to the output of an associated second sequence delay unit. Pulses, which can include photodetector signals that have been integrated and compared against a threshold voltage Vth, can be propagated through one or both chains of delay units. The output from the last delay unit in each chain is input to a phase discriminator, whose output is fed-back to delay units in the second chain and also to the comparator. A control voltage is preferably coupled to each delay unit in the first chain, to vary delay times through the chain.

In this second embodiment, TOF is acquired after a calibration phase during which a GlobalSync pulse train is forced the first and second chain of delay units. During calibration, the phase discriminator forces substantial (but not perfect) equalization of total time delays though both chains. During a measurement phase, a single Sync pulse is propagated to all pixel detectors. When the pulse reaches a pixel detector it is forced through the first chain of delay units, thereby creating a copy of the pulse at various delay times Cx. When an actual light pulse is detected at time $t_{TOF}$, a photodetector current pulse is generated and integrated and coupled to a comparator until time $t_{TOF}+t_{C\setminus OMP}$. The comparator changes state and the state transition is eventually propagated through the second chain of delay units. The latches coupled between the two chains can capture the precise time at which a light pulse was received from a target object. An embodiment providing successive measurement approximation is used to enhance resolution.

Other features and advantages of the invention will appear from the following description in which the preferred embodiments have been set forth in detail, in conjunction with their accompanying drawings.

BRIEF DESCRIPTION OF THE DRAWINGS

FIGS. 2A–2D depict generic embodiments of a circuit to improve dynamic range of acquired brightness data, according to the present invention;

FIGS. 3B–3K depict exemplary timing waveforms for the circuit of FIG. 3A, according to the present invention;

FIG. 4 depicts successive approximate measurement resolution, according to the present invention;

FIG. 5A depicts an exemplary circuit for range adjustment, according to the present invention;

FIGS. 5B–5E depict exemplary timing waveforms for the circuit of FIG. 5A, according to the present invention.

DETAILED DESCRIPTION OF THE PREFERRED EMBODIMENT

The present invention may be used with a variety of imaging sensing systems, including systems such as that described in U.S. Pat. No. 6,323,942 entitled "CMOS-Compatible Three-Dimensional Image Sensor IC" (2001), assigned to assignee herein. Other systems with which the present invention may be practiced are disclosed in U.S. patent applications Ser. No. 09/876,373 entitled "CMOS-Compatible Three-Dimensional Image Sensing Using Reduced Peak Energy", filed Jun. 6, 2001, and Ser. No. 10/020,393 entitled "Methods for CMOS-Compatible Three-dimensional Image Sensing Using Quantum Efficiency Modulation", filed Dec. 11, 2001, each application assigned to the assignee herein.

Figure 1:
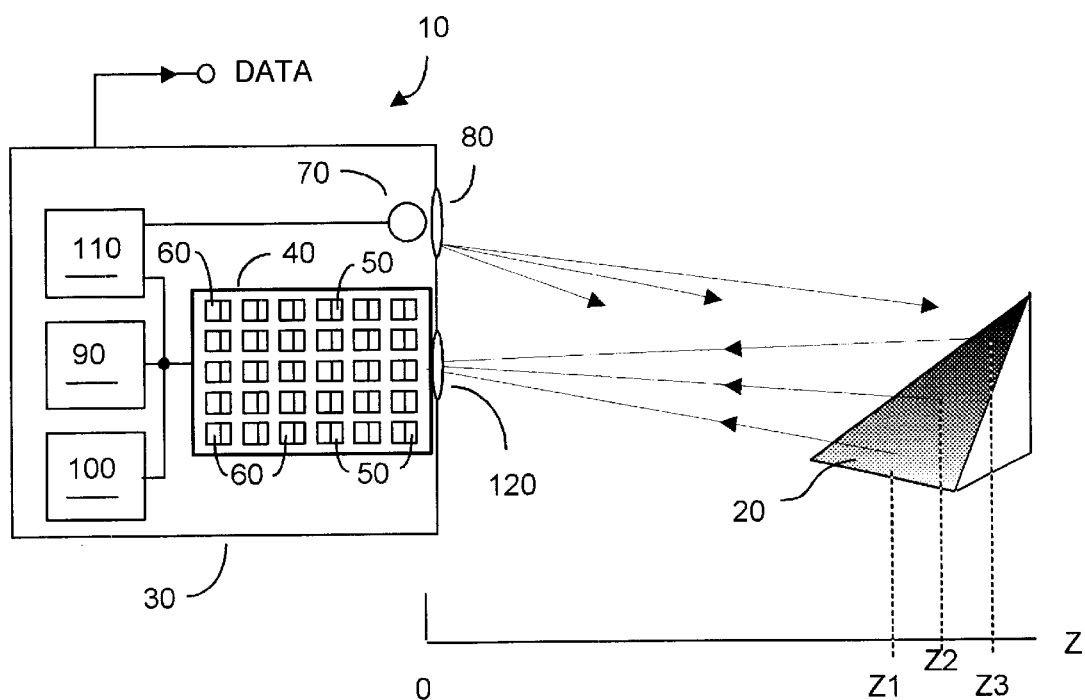
FIG. 1 is a diagram depicting a CMOS-implementable three-dimensional imaging system implemented on a single IC, according to U.S. Pat. No. 6,323,942.
Figure 2A:
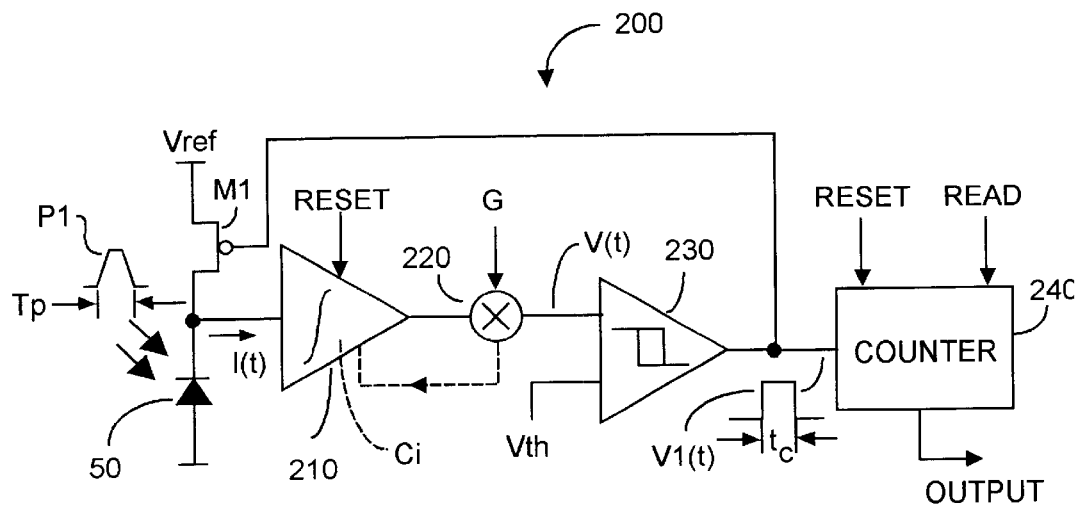

FIG. 2A depicts a generic circuit 200 coupled to a pixel detector or photodiode 50, for example a pixel detector in an array of pixel detectors such as array 40 in FIG. 1. As such, circuit 200 can represent individual circuits 60, shown in FIG. 1. Indeed, circuit 200 may be used with the system of FIG. 1 to improve system performance.

Pixel detector 50 is reverse-biased by a MOS transistor M1, and while a PMOS device is shown in FIG. 2A, an NMOS device or indeed other device could instead be used. In FIG. 2A, pixel detector 50 will output detection current I(t) in response to detected incoming photon energy, for example energy associated with a pulse P1 of photon energy reflected from a target object 20, responsive to an emitted pulse of energy from emitter 70, such as shown in FIG. 1. As will now be described, circuit 200 is used to increase the dynamic range for acquisition of brightness (amplitude) information associated within detected pulses of photon energy such as P1. One result is that circuit components in FIG. 2A, e.g., integrator 210, gain control mixer 220, comparator 230 are substantially less likely to saturate, and as a result, circuit 200 functions more rapidly and accurately.

Photodiodes such as pixel detectors 50 are commonly fabricated on a silicon semiconductor substrate with semi-conducting P-N junctions. In such photodiodes, most photons reaching the surface of the pixel detector penetrate the silicon from to a depth that is wavelength-dependent. The photons are absorbed by the silicon material, which in turn generates one or more pairs of negative and positive electrical charges, so-called electron-hole pairs. The charges are accelerated to the anode and cathode leads of the pixel detector. This flow of charges gives rise to a very small detection current I(t), generally of the order of femto-amperes, pico-amperes, or nano-amperes.

In one embodiment of the present invention, a brightness acquisition period begins when a RESET signal (preferably controlled by microprocessor 90; see FIG. 1) changes state. The RESET state change releases the various circuits comprising circuit 200 from their reset state. When a pulse of energy (P1) is received, the pixel detector-generated photodiode current i(t) is integrated by integrator 210. The length of integration is the shorter of the duration of the pulse $T_p$, or the duration of the integration time $t_i$, whichever comes first. In an exemplary system 10, Tp may have a pulse width of a few ns to perhaps 1 $\mu$s, with a period of perhaps 100 $\mu$s. Integrator 210 has a variable gain (G) control mixer 220, and acts to convert photodiode current I(t) to a voltage signal V(t), which is input to a comparator 230. The output from comparator 230 is coupled as input to logic counter 240.

Figure 2B:
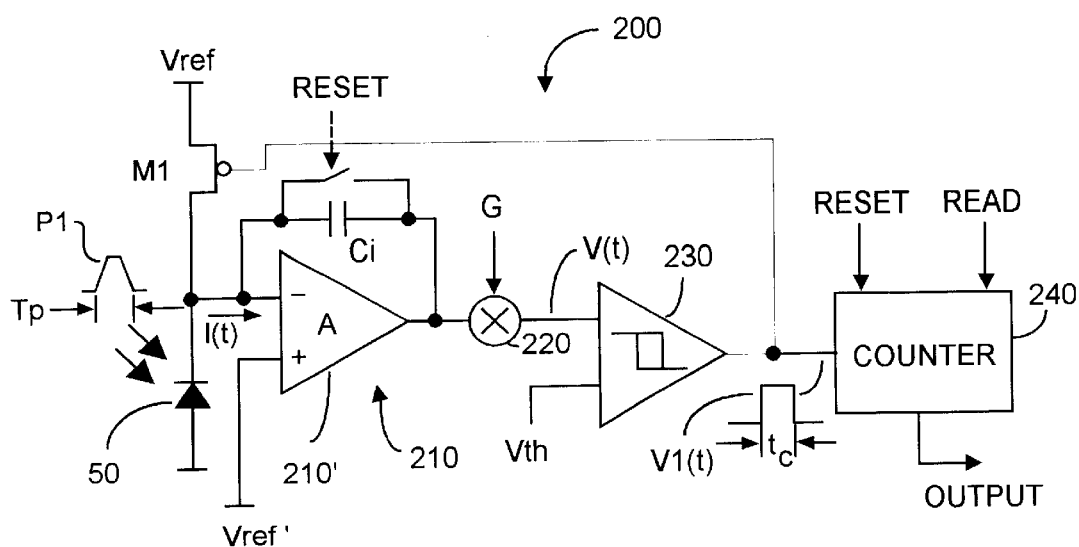

In FIG. 2A, circuit component 210 is a generic integrator that is reset upon receipt of the RESET signal. By contrast, in FIG. 2B, integrator unit 210 includes a preferably infinitely high gain (A) operational amplifier 210' and an integration capacitor Ci, coupled from output to input as shown. In FIG. 2B, gain control unit 220 operates upon magnitude of the integration signal output by amplifier 210'. In FIG. 2B, the RESET function is implemented by discharging capacitor Ci, e.g., with a MOS switch, and reference potentials Vref, Vref' may (but need not be) the same magnitude. In FIG. 2C, integrator 210 is essentially a capacitor Ci, coupled as shown. In this configuration, variable gain G operates on the integrated signal. The reset function is implemented by virtue of the feedback to MOS device M1. In one embodiment, rather than provide dedicated integration capacitors Ci, the integration capacitor is simply the already present parasitic shunt capacitance Ci, associated with photodetector device 50. Turning now to FIG. 2D, integrator 210 includes high gain amplifier 210', and integration capacitor Ci. In this embodiment, part of the reset function is implemented by coupled a stair-step or ramp-like function Vref'(t) to the non-inverting input of amplifier 210', as shown. It is to be understood that the embodiments of FIGS. 2A–2D are intended to be exemplary, and other techniques may instead be used.

Logic counter 240 may advantageously be implemented using a sequence of latches, which embodiment enables much of the logic counter circuitry to be re-used for the TOF acquisition circuit described with reference to FIG. 3A. Those skilled in the art will appreciate that logic counter 240 may be implemented using a sequence of series-coupled delay units with appropriate feedback. Other implementations for logic counter 240 could, without limitation, include an asynchronous ripple counter, a synchronous counter, and a so-called pseudo-random sequence generator that stores a unique state code for each counted clock cycle. An advantage of pseudo-random generator counters is their small implementation size, and a counting ability that is essentially limited only by the transition time of the individual delay units, which time may be on the order of only 10 ps or so. In addition to high speed capability, such logic counters are perfectly synchronous, which means no time is required to propagate pulses before knowing the count. By breaking an exclusive-OR loop associated with such logic counter 240, the stored count value can be shifted-out simply by setting the clock inputs. The resultant string of clock pulses is automatically coded for sequential readout, without requiring parallel readout.

Returning to FIGS. 2A–2D, when magnitude of the integration voltage V(t) reaches a threshold voltage magnitude $V_{th}$, comparator 230 changes state. The change of state is fed-back to MOS (or other) device M1, in the embodiment shown. Transistor M1, which preferably is coupled to Vref, resets photodiode 50 and thus can prevent what might otherwise be saturation and diminished response time characteristics. In the configuration shown, reset brings the bias for photodiode 50 to a high magnitude, here Vref. In the embodiment of FIG. 2A, at the same time integrator 210 and counter 240 are reset. In the embodiment of FIG. 2B, at the same time integration capacitor Ci is reset directly, and counter 240 is also reset. In the embodiment of FIG. 2C, the feedback to MOS device 50 serves to reset integration capacitor Ci, while counter 240 is reset. Finally, in the embodiment of FIG. 2D, Vref'(t) serves to reset integrator unit 210, while counter 240 is reset. Note that in FIGS. 2A–2D, if the Vth potential input to comparator 230 were a Vref(t) type function, that such time-varying voltage waveform could also serve as a reset function, but saturation of signal V(t) could result. Note that in general if the count held by logic counter 240 were stored, it would suffice in FIGS. 2A–2D to reset the detector and the integrator.

The feedback from the output of comparator 230 to the input of integrator 210 is designed to generate a comparator 230 output pulse V1(t) of sufficient duration $t_c$ that will cause logic counter 240 to increment its state by one. In practice, a width $t_c$ exceeding about 1 ns should suffice using existing logic counters 240. The above-described acquisition process continues until the output of the counter 240 is read, e.g., when the READ goes high, whereupon the measurement period is concluded. The READ signal preferably is generated by microprocessor 90 in FIG. 1, although other control mechanisms could instead or in addition be used. Microprocessor 90 (or the equivalent) can thus cause the internally latched contents of counter 240 to be output for further processing, including outputting from system 10 (see FIG. 1).

In general, the frequency of the V1(t) pulses counted by counter 240 will vary inversely with magnitude of the integration capacitor Ci. If photodetector 50 responds to a energy reflected from a constant brightness target object, the number of V1(t) pulses that are counted will vary. On the other hand, if the pulse width of V1(t) were kept constant and the brightness were varied, the duty cycle or frequency of the V1(t) pulse train being counted would change. In the preferred embodiment, the V1(t) pulse width $t_c$ is maintained constant, and detected brightness changes are manifested by frequency change in the pulse train counted by counter 240. Thus, after a given acquisition time period, a finite measurement is obtained from the counter.

Note that if the V1(t) pulse width were changed, circuit 200 could be used to implement a precise frequency or phase modulation discriminator. If such discriminator were used with a high speed clock, say about 1 GHz, signals as high as about 100 MHz could be demodulated with a resolution in the 1 ns range. Such discriminator could also be used to demodulate amplitude modulated signals, phase-amplitude modulated signals, pulse amplitude (PAM) modulated signals, and pulse phase modulated (PPM) signals. Note that in PPM applications, a bank of counters with different resets could be used, and that granularity of the PPM position would be determined by the pulse width and by the system clock, but not by the number of counters used. Thus, if the pulse width were suitably long, a relatively small number of counters could suffice. In a phase shift keying (PSK) application, rather than modulate pulse phases, a signal that includes changing amplitude sinewave and cosine waves is employed, and a two-dimensional space is used for encoding. Advantageously such systems can provide a relatively large number of encoding bits to promote spectral efficiency.

Use of circuit 200 as a sophisticated demodulator can have very practical applicability in IR sensing. Assume for example that in a given environment, a room perhaps, several systems such as system 10 are operating simultaneously, perhaps under control of different users. Accurately determining brightness and TOF information will be compromised unless it can be known that a given system 10 is responding to reflected pulses emitted by that system 10, and is not responding to pulses or signals emitted by another user's system 10, or perhaps a totally different system.

Using circuit 200 as a demodulator, system 10 can be somewhat modified such that microprocessor 90 commands emitter 70 to emit a pseudo-random sequence of pulses, each pulse having similar amplitude, width, and phase. Within system 10, circuit 200 would be set up to detected return pulses output by pixel detectors 50 that have the same pseudo-random pulse sequence. Signal processing within system 10 would involve averaging the incoming pulse trains for comparison against an average of the emitted pulse trains. The effect would be that other pulse trains not emitted by this particular system 10 would be ignored. As a result, a so-modified system 10 could respond to reflected emitted pulses while discriminating against incoming pulses or signals from another system or source. For example, if eight-bits were used in the pseudo-random sequencing, at most 255 different system 10s could be operated simultaneously without interfering with each other. A higher number of bits would of course allow more systems to operate in a close environment without interfering with each other unduly.

Ideally, integrator 210 output signal v(t) would have no magnitude limits, but practical integrators tend to saturate at relatively low voltages, typically 1 VDC to about 3 VDC. Thus, preferably integrator gain G 220 is generally set to allow circuit 200 to function over a reasonable range of operation. Such range is usually referred to as dynamic range DR and it is characterized as $$DR = 20 \cdot \text{Log}(V_H/V_L),$$

where $V_H$ and $V_L$ represent V(t) at the integrator output, associated with the highest and the lowest energy input pulse P1 power, respectively.

The above-described topology advantageously alleviates problems that otherwise would limit dynamic range of circuit 200, or circuits 60 in FIG. 1. On one hand, G can advantageously be set to relatively very high values to better enable detection of dim light (e.g., low amplitude of P1 pulses). On the other hand, the feedback loop shown prevents integrator output voltage V(t) from entering a saturation region. The described combination enables extremely high values of dynamic range to be achieved, using relatively simple circuitry that inherently consumes low power.

As such, design specifications on slew rate and bandwidth of the integrator can be relaxed, which further simplifies the design. It will be appreciated that the simplicity and ease of implementation permits using circuit 200 use as electronics 60 in an array 40 that may comprise thousand or millions of pixel detectors 50 (see FIG. 1). In other applications, circuit 200 may be readily integrated with pixel detectors in large arrays, including use in camera-like applications.

A further advantage of circuit 200 is superior noise performance, since noise associated with the release and subsequent reset of integrator 210 is reduced when compared with the measurable signal. The signal-to-noise ratio (SNR), referred to the output of the integrator, is given by:

$$SNR = 10 \cdot Log(G^{2/N}),$$

where G is integrator gain, and N represents the sum of all noise sources referred to the output of integrator 210. In practice, the SNR helps govern the minimum number of bits required in analog-to-digital conversion in system 10. The SNR should be less than the quantization noise associated with analog-to-digital converters in the system. In practice, if the SNR is 45 dB, then six-bit conversion will suffice, a SNR of 96 dB is commensurate with about 16-bit conversion. In a preferred embodiment of the present invention used with system 10, nine-bit conversion is used.

In preferred implementations of circuit 200, pixel detector photodiode current i(t) can be coupled to an integration capacitor $C_i$ to be integrated and converted into voltage V(t). As such, integrator 210 may be an integration capacitor $C_i$. The relationship between detection current i(t), Ci, and the integration output voltage V(t) is given by:

$$V(t) = (1/Ci) \int i(t) dt$$

On one hand, making Ci large tends to reduce saturation because magnitude of V(t) is reduced, but integration or conversion gain is lost. On the other hand, making Ci small increases integration gain to permit response to very small i(t) signals, but increases likelihood of saturation. In the present invention, integrator 210 is preferably implemented with a relatively small capacitor Ci, for example 5 fF to about 200 fF. A small magnitude capacitor Ci promotes high gain, but circuit reset feedback prevents saturation. The result is a circuit that can exhibit both high gain and high immunity to saturation, e.g., a circuit that can respond to brightness signals having a very large dynamic range.

In circuit 200 (see FIGS. 2A–2D), there are primary two noise sources that must be considered: thermal noise, and shot or Poisson noise. In general, the more dominant contribution to thermal noise is kT/C noise, which in turn is dominated by noise from the integration capacitor Ci, as follows:

$$N \approx N_i = kT/C_i$$

where k is the Boltzmann constant and T is absolute temperature. In the embodiments described, integrator gain is generally computed as $$G = A'/C_i$$

where A' is a circuit-dependent constant and $C_i$ is the integration capacitor. Under the above assumptions, the SNR for circuit 200 is approximated by $$SNR \approx 10 \cdot Log(A'G/kT).$$

Thus, a high gain G is highly desirable to improve SNR. Referring briefly to FIG. 2D and time-varying function Vref(t), kT/C noise source can be substantially reduced (or at least be made independent of $C_i$) by performing the reset using a stair-step like voltage Vref(t). The noise $N_s$ generated by incrementing Vref(t) will be inversely proportional to a capacitor $C_s$ that preferably is used to generate the stair-step waveform Vref(t). However such Vref(t) waveform may be generated, the kT/C noise associated with such waveform may be represented by the contribution of voltage-switching across an equivalent capacitor Cs. The noise Ns contribution is then:

$$N_s = kT/C_s.$$

Note that $N_s$ can be made arbitrarily small by increasing $C_s$.

Note from the above that $C_s$ is not limited by constraints on the gain of circuit 200, but rather by the circuit acquisition time. If the above-described reset method is used, then $N_s$ can be excluded. The result is that total SNR will be dominated by photonic noise $N_\phi$. $N_\phi$ is computed in terms of the variance of the charge that is detected at the photodiode and amplified by the front-end (i.e., $Q = C_i \cdot dV(t)/dt$, independently of the specific integration or amplification components that are used.

The second most dominant noise source, Poisson or shot noise. In the embodiments described, such noise is caused by reflected energy photons interacting with the substrate upon which pixel detectors 50 are formed. Thus, such noise is known as photonic noise, and may be expressed as:

$$N_\phi = G^2 e^2 E,$$

where $e = 1.6 \times 10^{-19}$ Coulombs electron charge, and E is the number of detected electrons.

Thus, the resulting signal-to-noise ratio is approximated by $$SNR \approx 10 Log(E),$$

and is only dependent on the number of detected photons.

Figure 3A:
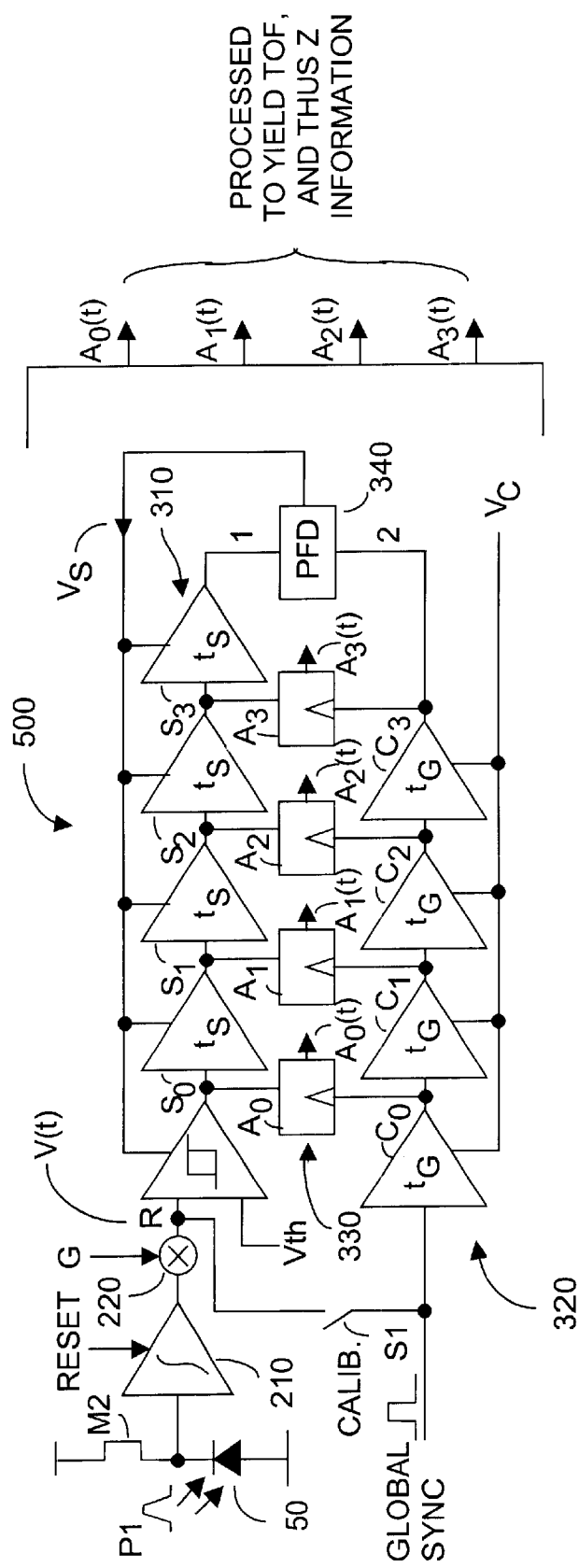
FIG. 3A depicts a preferred embodiment of a circuit to improve acquisition of time-of-flight (TOF) data, according to the present invention.

Referring now to FIG. 3A, another embodiment of the present invention is directed to improved acquisition of time of flight (TOF) data. In FIG. 3A, TOF acquisition circuit 300 essentially re-uses the front-end circuit components of circuit 200, e.g., integrator 210, gain control mixer 220, comparator 230, source potential for Vth, source, etc. Components in FIG. 3A that are similarly numbered as components in FIGS. 2A–2D may be the same components as described with respect to those figures. FIGS. 3B–3K depict waveforms at various node points in FIG. 3A.

Acquisition circuit preferably 300 further includes a sequence 310 of S type delays denoted S0, S1, S2, S3, a sequence 320 of C-type delays denoted C0, C1, C2, C3, and a sequence 330 of latches denoted A0, A1, A2, A3. As shown, preferably there is a like number of S-type delays, C-type delays, and latches. If desired, a sequence comprising more or less than four S-type delays, C-type delays, and latches may be used. The various delay units may be implemented in a number of ways, including using logic-delay gates. Advantageously, the sequence 330 of latches A0, A1, . . . depicted in FIG. 3 may comprise the same latches with which logic counter 240 in FIGS. 2A–2D may be implemented. Thus, some or all of the sequence 330 of latches in FIG. 3A may serve double-duty as logic counter 240 in FIGS. 2A–2D. In FIG. 3A, latch $A_0$ outputs a latch signal $A_0(t)$, latch $A_1$ outputs a latch signal $A_1(t)$, and so forth. As shown by the right-hand portion of FIG. 3A, the various latch output signals $A_0(t), A_1(t)$, etc. are available for processing to yield per pixel time-of-flight (TOF)

information, and thus distance (Z) information. As noted above, these latches may be implemented as logic counters 240 (see FIGS. 2A–2D) that comprise sequences of latches, e.g., a pseudo-random sequence generator counter. In such implementation, output signals $A_0(t)$, $A_1(t)$, etc., would be counter output signals.

Acquisition circuit 300 preferably operates in a calibration phase and in a measurement phase, both phases preferably under control of microprocessor 90 in FIG. 1. During the calibration phase, a calibration switch S1 forces a train of synchronization pulses Gsync (see FIG. 3B) through a chain that comprises both the sequence 310 of S-type delay units and the sequence 320 of C-type delay units. The Gsync pulses will be preferably synchronized to pulse signals causing emitter 70 to emit energy, whose reflection is detected by pixel detectors 50 (see FIG. 1). FIGS. 3C–3F depict the propagation through the C-type delay units. Thus, in calibration mode, a copy of the Gsync pulse (which may be generated under control of microprocessor 90 in FIG. 1) propagates until the end of the sequence chains. Upon reaching the end of the sequence chains, the two versions of the propagated Gsync pulse are input to a phase discriminator (PFD) 340, The output from PFD 340 will be a low unless delay chains 310 and 320 each propagate a pulse to PFD 340 simultaneously. Otherwise, PFD 340 forces substantial (but not perfect) equalization of total delays through both chains 310 and 320 via the $V_s$ feedback loop, and in the configuration shown, at lock, the PFD output will be high. In the equalization state, the various bits held in latches A0, A1, A2, etc. will be the same. The above-described topology is often referred to as a delay locked loop (DLL) configuration, and when the Vs feedback loop forces delay equalization, circuit 300 is in a locked state condition.

An external signal $V_c$ is coupled to sequence 320 of C-type delays for use in determining the traveling time for the Gsync through sequence chain 310 and chain 320. Further details as to external signal Vc are given later herein. During a measurement phase, calibration switch S1 (which may of course be a semiconductor switch) is opened. A single synchronization pulse is sent to all pixel detectors 50. When this synchronization pulse reaches a pixel detector, it is forced through sequence chain 320 of C-type delay cells. The result is to create a copy of the thus-propagated pulse at various delay times (signals $C_x$) through sequence chain 320.

When a pulse of light is received at time $t_{TOF}$, a current pulse I(t) is generated by the recipient photodetector 50 and integrated by integrator 200. Looking now at the inputs to comparator 210, when the integrated output voltage signal V(t) voltage exceeds threshold Vth, comparator 230 changes state. FIGS. 3G and 3H shows that the output of comparator 230 transitions at time $t_{TOF}+t_{comp}$. The state transition generated by comparator 230 is eventually propagated through the chain of S variable delay cells (signals $S_x$), as shown by waveforms 3H–3K.

The sequence chain 230 of latches A0, A1, A2, A4 is coupled between sequence chain 310 and sequence chain 320. In the exemplary configuration shown in FIG. 3A, the clock input to each latch is coupled to Cx and the data input to each latch is coupled to Sx, e.g., latch A0 is coupled to S0 and to C0, etc.

Assuming that a locking condition holds, i.e.

$$t_{TOF}+t_{comp}+S\tau_s<C\tau_g,$$

then the latches will capture the precise instant in time at which the light pulse was received by the associated pixel detector (or photodiode). The time resolution is $|\tau_s-\tau_g|$.

For example assume that case where C=S=8, $\tau_s$=90 ps, and $\tau_g$=100 ps. Assume too that the latch outputs are $A_0$=H, $A_1$=H, $A_2$=H, $A_3$=L, $A_4$=L, $A_5$=L, $A_6$=L, $A_7$=L (where H is a digital one, and L is a digital zero). Under these circumstances, the actual delay $t_{TOF}+t_{comp}$ is $$30\ ps<t_{TOF}+t_{comp}<40\ ps.$$

To ensure that the locking conditions hold, one can adjust an externally provided bias voltage $V_c$ that is coupled to the C-type delay units, while $V_s$ tracks the change by virtue of the $V_c$ connection loop. As described above, the DLL circuit is activated by the initial train of synchronization pulses. Magnitudes of voltages $V_s$ and $V_c$ may be stored, e.g., in memory 100 in FIG. 1, so as to maintain proper calibration. Note that while FIG. 3A (and FIG. 5A) depict Vs coupled to each delay element in chain 310, and depict Vc coupled to each delay element in chain 320, one could instead delay different elements in different chains by different time amounts. Such technique could, for example, provide higher resolution in time interval regions of special interest.

It is seen that measurement resolution is determined essentially exclusive by time steps $\tau_s$ and $\tau_g$. The time range is the minimum time that system 10 (or other system) can detect, to the maximum time such system can detect. However the time range covered by the present invention is determined by C and S. Assuming C=S, the following is true:

$$t_{min}=t_{TOF}+t_{comp}+C\tau_g$$

$$t_{max}=t_{TOF}+t_{comp}+C\tau_s$$

from which it follows that:

$$t_{range}=t_{max}-t_{min}=C|\tau_s-\tau_g|.$$

Understandably, a large measurement range is desirable. Providing a large measurement range can be achieved by increasing C and S, or by implementing a successive approximation approach. Increasing C results in adding latch stages, which requires additional area on the integrated circuit upon which the present invention preferably is fabricated, e.g., IC 30 in FIG. 1. For example, to achieve 8-bit resolution, one would have to resolve 256 slots of time within the time range, an approach that would require 256 latches. In a practical embodiment, system 10 provided with circuits exemplified by FIG. 3A can recognize 1 ns with a granularity or resolution of about 12 ps. Delay units in FIG. 3A that can provide 100 ps will permit detecting a variation and resolution on the order of 10 ps.

Note that in the calibration mode, it is desired that propagation time through the first chain 310 of delay elements is made substantially but not precisely equal to propagation time through the second chain of delay elements 320. Stated differently, $|\tau_s-\tau_g|$ should be made equal to the desired time increment resolution, and thus should not be precisely zero.

It will be appreciated from the above description of FIGS. 3A–3K that relatively slow delay units can be used while still providing precise detection time resolution. Note too that there is really no need to trim components in circuit 300 in that the calibration process is dynamic and robust.

As will now be described, one can implement a successive approximation approach that dynamically changes the measurement range of circuit 300 and system 10 (or the equivalent) from coarse to fine until the desired resolution is obtained. Advantageously, using such an approach, the center of the range can also be modified and maintained as close as possible to the exact point in time. In the present invention, such approach is implemented by varying threshold voltage $V_{th}$ coupled as input to comparator 230. (See FIG. 2.)

FIG. 4 depicts an exemplary successive approximation approach, according to the present invention. Assume that TOF target time is 7.6 ns and that TOF measurement should have a resolution of less than about 100 ps. Given these assumptions, S=4 would suffice for a four-stage approximation, denoted in FIG. 4 as 400, 410, 420, 430. As shown, progressing from the first (most coarse) stage to the fourth (high resolution) stage, resolution improves to where at stage four, readout accuracy is within about 31.25 ps, a resolution well within the design goal.

The approximation approach exemplified in FIG. 4 may be extended to fewer or more successive approximations, and/or for a smaller or larger number for S. If S=2, the result process is known as binary successive approximation. Adjusting the time range involves a calibration operation. During calibration, voltages magnitudes for $V_s$ and $V_c$ are modified to change the values of $\tau_s$ and $\tau_g$. Further, magnitude of $V_{th}$ can also be altered to redefine the center of the measurement range. In one embodiment, varying magnitude of Vc will vary the time delay associated with sequence chain 320, for example increasing magnitude of Vc can increase the per-unit delay time through chain 320. Thus, instead of operating with a time range of say 1 ns with 10 ps resolution, circuit 300 can be dynamically reconfigured (e.g., by varying Vc) to now operating with a time range of say 1 $\mu$s with a resolution of 100 ns. While the embodiment shown in FIG. 4 uses four measurements, to arrive at the same range and resolution using a single measurement would require using not a four-delay stage configuration, but rather a $4^4$-delay stage configuration.

The above procedure is depicted in the embodiment of FIG. 5A. In circuit 500, varying the resolution range from coarse to fine or vice versa involves varying the average time delay of the Cx chain 320. As a consequence of varying this average time delay, the DLL feedback will react by equalizing the time delay through the Sx chain 310. When equilibrium is reached, a measurement of the time-of-flight can be performed. Similar to the comments made earlier herein with reference to FIG. 3A, in FIG. 5A latch $A_0$ outputs a latch signal $A_0(t)$, latch $A_1$ outputs a latch signal $A_1(t)$, etc. As shown by the right-hand portion of FIG. 5A, the various latch output signals $A_0(t)$, $A_1(t)$, etc. are available for processing to yield per pixel time-of-flight (TOF) information, and thus distance (Z) information. Again, as noted above, these latches may be implemented as logic counters 240 (see FIGS. 2A–2D) that comprise sequences of latches, e.g., a pseudo-random sequence generator counter, in which case output signals $A_0(t)$, $A_1(t)$, etc. would be counter output signals. Timing diagrams shown in FIGS. 5B–5E demonstrate how changing the delay and the pulse width through the Cx chain (whose output is noted in FIG. 5 as node 2) results in tracking through the Sx chain (whose output is noted in FIG. 5 as node 1). As a result, both $\tau_s$ and $\tau_g$ are increased, thus increasing the measurement range without modifying S or C.

The above-described delay adjustment relies upon the operation of the DLL feedback loop. Phase discriminator 340 outputs a voltage signal proportional to phase difference between the signals at the output of the Sx and Cx chains. The phase discriminator output voltage will normally be filtered and regenerated (using techniques known in the art and not explicitly depicted in FIG. 5A) so as to be acceptably stable when coupled to delay chain 310. In circuit 500, each cell or unit in the chain sequences 310, 320 will delay the relevant signal by an amount of time proportional to the delay cell bias voltage, e.g., Vs for chain 310, and Vc for chain 320. Understandably feedback is designed to ensure stable operation of the circuit. The settling time, i.e. the time needed for the Sx chain to track delay through the Cx chain, will be determined by the feedback loop design. The number of pulses in the synchronization train wants to be sufficient to ensure that proper lock has occurred, which is to say that tracking is complete. As noted, magnitude of voltages $V_s$ and $V_c$ will be stored between calibration events to promote accurate capture of $t_{TOF}$.

In practice, time delay through chains 310 and 320 can degrade after time due to time-variant changes for $V_c$ and $V_s$, due to other variations in the delay cells, e.g., ageing, temperature variations, etc. Accordingly, the calibration phase should be repeated periodically to ensure that the timing range remains within predefined boundaries with a desired tolerance. Thus, overall circuit 500 is inherently more robust than prior art approaches.

Figure 6:
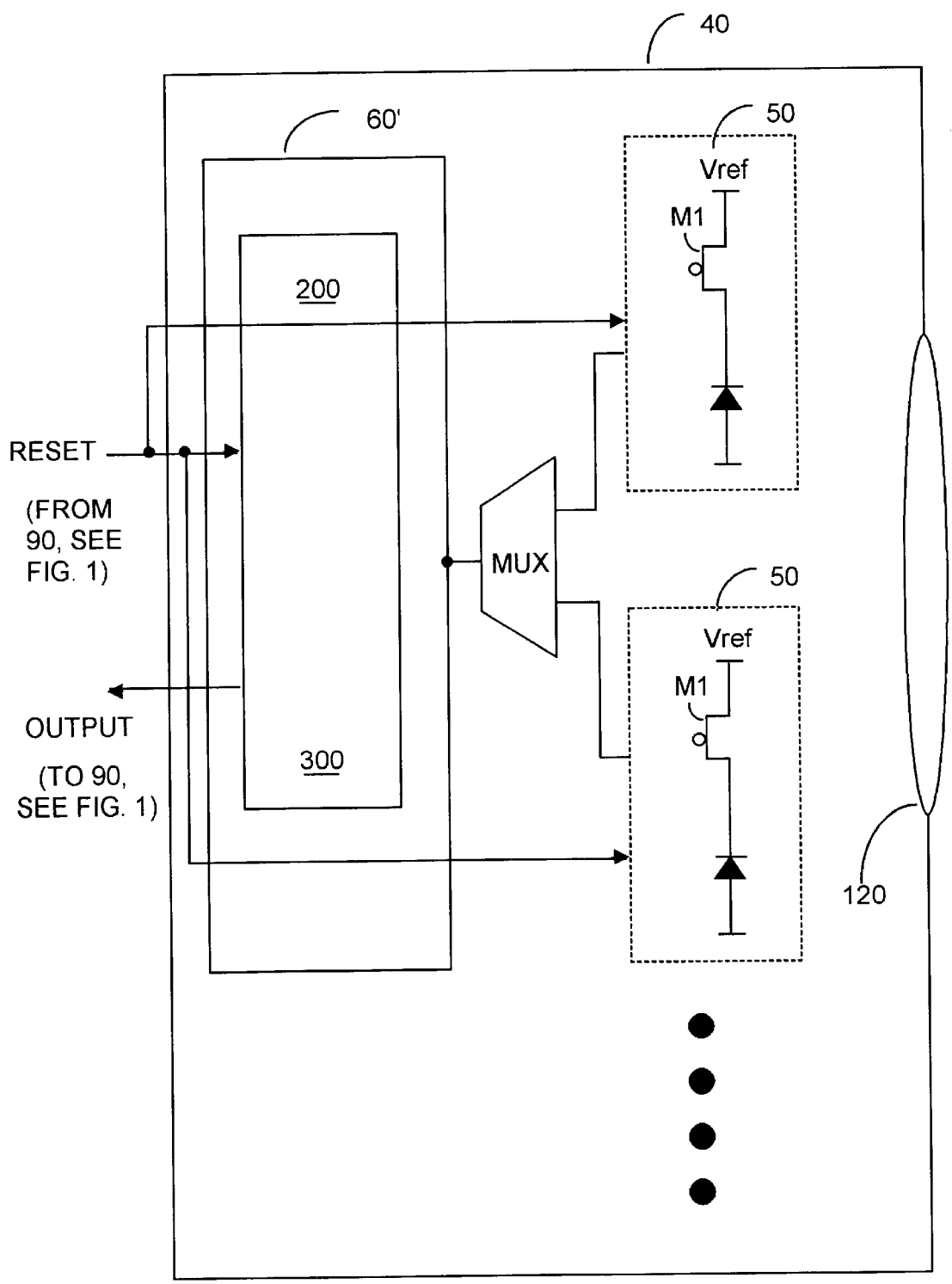
FIG. 6 depicts a multiplexed embodiment of the present invention.

Thus far, the various embodiments have been described in the context of providing an individual circuit, e.g., circuit 200 and/or circuit 300, for every photodiode 50 in array 40. Turning now to FIG. 6, it is apparent that one could instead use multiplex techniques to reduce the total number of circuits 200 and/or 300. For example in FIG. 6, one circuit 200 and one circuit 300 are used for two photodiodes 50. The box denoting circuits 200 and 300 intentionally is labeled 200 and 300 to show the overlap or re-use of components in the two circuits. For example, counter 240 in circuit 200 shown in FIGS. 2A–2D may preferably be implemented using some or all of the latch units 330 in circuit 300 shown in FIG. 3A. If desired, more than two photodiodes could share a single circuit 200 and/or 300.

While embodiments of the present invention directed to improved acquisition of brightness information, and time-of-flight information have been described, it is understood that it is not necessary to provide all embodiments in every system. Thus, a system can benefit from improved brightness acquisition and/or time-of-flight measurement accuracy, according to the present invention. Further, embodiments improving brightness acquisition may be used in other than range-finding system applications, including for example, to improve dynamic range in two-dimensional pixel arrays.

Modifications and variations may be made to the disclosed embodiments without departing from the subject and spirit of the invention as defined by the following claims.

What is claimed is:

1. A high dynamic range circuit useable with a range finding system that emits energy and detects energy reflected by a target object to determine time-of-flight to said target object, the circuit comprising:

at least one detector to detect reflected said energy and to output a detection signal proportional at least in part to detected reflected said energy;

for each said detector, a resettable integrator with dynamically variable gain coupled to integrate said detection signal and to output an integration signal;

for each said detector, a comparator coupled to compare said integration signal against a threshold level and to output a comparator pulse when said integration signal exceeds said threshold level, an output of said comparator being fed-back to reset said detector;

for each said detector, a resettable logic counter coupled to count each said comparator pulse; and means for providing a RESET signal to said resettable integrator and to said resettable logic counter;

wherein when said resettable logic counter attains a given count, a count value within said logic counter is read-out as an output of said circuit proportional to detected reflected said energy, and said RESET signal is provided to reset at least two of (i) said detector, (ii) said comparator, and (iii) said resettable logic counter.

2. The circuit of claim 1, wherein said range finding system is a three-dimensional range finding system, and said detector is a photodiode.

3. The circuit of claim 1, wherein said detector is a photodiode, and said resettable integrator is a capacitor selected from a group consisting of (a) a parasitic shunt capacitance of said photodiode, and (b) a physical capacitor.

4. The circuit of claim 1, wherein said detector is a photodiode coupled to a bias source, and an output of said comparator is fed-back to said bias source to reset said photodiode.

5. The circuit of claim 1, wherein said resettable logic counter is implemented using a circuit selected from a group consisting of (a) a series-coupled group of latch circuits, (b) an asynchronous ripple counter, (c) a synchronous counter, and (d) a pseudo-random generator counter.

6. The circuit of claim 1, wherein:
said detector is a photodiode in an array of photodiodes;
one said circuit is provided for each said photodiode; and
said array and each said circuit are fabricated on a single integrated circuit.

7. The circuit of claim 1, wherein:
said detector is a photodiode in an array of photodiodes;
one said circuit is multiplexed-coupled to at least two of said photodiodes; and
said array and each said circuit are fabricated on a single integrated circuit.

8. The circuit of claim 1, wherein for each said detector there is a dedicated resettable integrator.

9. The circuit of claim 1, wherein for each said detector there is a dedicated comparator.

10. The circuit of claim 1, wherein for each said detector there is a dedicated resettable logic counter.

11. The circuit of claim 1, wherein there are more detectors that at least one of a number of resettable intergrators, comparators, and resettable logic counters.

12. The circuit of claim 1, wherein there are fewer detectors than at least one of a number of resettable integrators, comparators, and resettable logic counters.

13. A method to enhance dynamic range of brightness data acquired by a range finding system that emits energy and includes at least one detector to detect target object reflected said energy and to output a detection signal used in determining time-of-flight to said target object, the method including the following steps:
(a) for each said detector, integrating said detection signal and outputting an integration signal using a resettable integrator having dynamically variable gain;
(b) for each said detector, comparing said integration signal against a threshold level using a comparator and outputting a comparator pulse when said integration signal exceeds said threshold level, an output of said comparator being fed-back to said detector;
(c) each said detector, coupling a resettable logic counter to count each said comparator pulse;
(d) reading-out as a measure of acquired said brightness data a count value from said logic counter when said logic counter attains a given count; and
(e) resetting at least two of (I) said detector, (ii) said integrator, and (iii) said logic counter.

14. The method of claim 13, wherein step (a) includes providing a capacitor for use as said resettable integrator.

15. The method of claim 13, wherein:
said detector is a photodiode coupled to a bias device; further including:
feeding back an output of said comparator to said bias device.

16. The method of claim 13, wherein:
said range finding system is a three-dimensional time-of-flight range finding system; and
said detector is a photodiode.

17. A circuit to resolve time-of flight (TOF) useable with a three-dimensional range finding system that emits energy and detects a portion of said energy reflected by a target object to determine TOF to said target object, the circuit comprising:
first means for propagating a copy of emitted said energy;
second means for propagating a copy of detected reflected said energy; and
means for determining when the propagated copy of emitted said energy coincides in time with the propagated copy of detected reflected said energy;
wherein said means for determining defines a time interval at which time coincidence is determined for use in resolving said TOF.

18. The circuit of claim 17, wherein at least one of said first means for propagating and said second means for propagating includes a number N of series-coupled delay elements, each of said delay elements contributing a known time delay.

19. The circuit of claim 17, wherein at least one of said first means for propagating and said second means for propagating includes a number N of series-coupled delay elements, each of said delay elements contributing a common time delay.

20. The circuit of claim 17, further including:
means for calibrating said circuit such that propagation time through said first means for propagating is made substantially but not precisely equal to propagation time through said second means for propagating.

21. The circuit of claim 17, wherein:
said first means for propagating includes a number N of series-coupled delay elements, where N is an integer greater than one;
said second means for propagating includes N of series-coupled delay elements;
said means for determining includes N latch units;
each of said N latch units having a clock input coupled to an output of an associated one of said N series-coupled delay elements in said first means for propagating, each of said N latch units further having a data input coupled to an input of an associated one of said N series-coupled delay elements in said second means for propagating;
wherein said time coincidence is determined by identifying a state change for each of said N latch units.

22. The circuit of claim 21, further including:
a phase discriminator having a first input coupled to receive from the Nth series-coupled delay element an output signal propagated through said first means for propagation, and having a second input coupled to receive from the Nth one of said N series-coupled delay elements an output signal propagated through said second means for propagation, said phase discriminator having an output coupled to vary time delay through said N series-coupled delay elements in said first means for propagation;

wherein in a calibration mode, propagation time through said first means for propagating is made substantially but not precisely equal to propagation time through said second means for propagating.

23. The circuit of claim 21, further including:

means for varying time delay through each of said N series-coupled delay elements.

24. A circuit to resolve time-of flight (TOF) useable with a three-dimensional range finding system that emits energy and detects energy reflected by a target object to determine TOF to said target object, the circuit comprising:

a first series-coupled group of N delay elements coupled to receive a copy of emitted said energy for propagation through said first series-coupled group, where N is an integer greater than one;

a second series-coupled group of N delay elements coupled to receive a copy of detected reflected said energy for propagation through said second series-coupled group;

a series-coupled group of N latch elements, each of said latch elements having a first input coupled to an input of an associated one of said first series-coupled group of N delay elements, and having a second input coupled to an output of one of said second series-coupled group of N delay elements; and a phase discriminator coupled to receive an output from the Nth delay element in said first series-coupled group and from an Nth delay element in said second series-coupled group, said phase discriminator generating an output signal coupled to vary delay through said first series-coupled group of N delay elements;

wherein a time interval defined within said N latch elements at which time coincidence is determined is used to resolve said TOF.

25. The circuit of claim 24, further including means for calibrating said circuit such that propagation time through said first series-coupled group is made substantially but not precisely equal to propagation time through said second series-coupled group.

26. The circuit of claim 24, wherein said circuit is fabricated on a common integrated circuit with at least some of said range finding system.

27. A method to resolve time-of flight (TOF) useable with a three-dimensional range finding system that emits energy and detects energy reflected by a target object determine TOF to the target object, the method including the following steps:

(a) propagating a copy of emitted said energy through a first delay system that permits observing incrementally delayed versions of the propagated said copy;

(b) propagating a copy of detected reflected said energy through a second delay system that permits observing incrementally delayed versions of the propagated said copy; and (c) comparing signals incrementally delayed through said first delay system with signals incrementally delayed through said second delay system to determine closest time coincidence of propagated compared said signals;

wherein time determination of closest said coincidence is used to resolve said TOF.

28. The method of claim 27, further including applying successive approximation to enhance resolution of said TOF.

29. The method of claim 27, further including, in a calibration mode, inputting an output from said first delay system and inputting an output from said second delay system to a phase discriminator whose phase discrimination output is fed-back to control delay through said first delay system.

30. The method of claim 27, further including, in a calibration mode, forcing substantial but not perfect equalization of total delay through said first delay system with total delay through said second delay system;

wherein TOF resolution is approximated by differential total delay through said first delay system and said second delay system.

31. The method of claim 30, wherein said TOF resolution is achieved in a first region of time; and further including repeating said calibration mode such that substantial but not perfect equalization of total delay is achieved for a second region of time that is a subset of said first region of time in which a previous said calibration mode was carried out;

wherein successive time approximation enhances resolution of said TOF.

32. A CMOS-implementable integrated circuit (IC) time-of-flight (TOF) measurement system used with a generator that emits energy a portion of which energy is reflected by a target object a distance Z from said IC to be detected by a photodiode detector in an array of photodiode detectors within said TOF measurement system, the IC comprising:

for each of said photodiode detectors, at least one of a first circuit and a second circuit;

said first circuit comprising:

a resettable integrator with dynamically variable gain coupled to integrate a detection signal output by said photodiode detector;

a comparator coupled to receive and to compare an integration signal output by said integrator against a threshold level and to output a comparator pulse when said integration signal exceeds said threshold level, an output of said comparator being fed-back to reset said photodiode detector; and a resettable logic counter coupled to count each said comparator pulse;

means for providing a RESET signal to said resettable integrator and to said resettabie logic counter;

wherein when said resettable logic counter attains a given count, a count value within said logic counter is read-out as an output of said circuit proportional at least in part to detected reflected said energy, and said RESET signal is provided to reset at least two of (i) said detector, (ii) said comparator, and (iii) said logic counter;

said second circuit comprising:

first means for propagating a copy of emitted said energy;

second means for propagating a copy of detected reflected said energy; and means for determining when in time the propagated copy of emitted said energy coincides with the propagated copy of detected reflected said energy;

wherein a time interval defined within said means for determining at which time coincidence is determined is used to resolve said TOF.

33. The IC of claim 32, further including:

means for identifying a pattern of energy emitted by said generator; and means for enabling said photodiode detectors to discern reflected energy emitted by said generator from energy emitted by another generator.

34. The IC of claim 33, wherein:

said generator emits energy in a pattern selected from a group consisting of (a) an amplitude modulation pattern, (b) a frequency modulation pattern, (c) a phase-amplitude modulated pattern, (d) a pulse phase modulation pattern, (e) a phase shift keying pattern, and (f) a pulse position modulation pattern.

35. The IC of claim 34, further including:

means enabling said photodiode detectors to recognized a pattern of energy emitted by said generator, said pattern selected from a group consisting of (a) amplitude demodulation, (b) frequency demodulation, (c) phase-amplitude demodulation, (d) pulse phase demodulation, (e) a phase shift de-keying, and (f) pulse position demodulation.

\* \* \* \* \*

UNITED STATES PATENT AND TRADEMARK OFFICE
CERTIFICATE OF CORRECTION

PATENT NO.    : 6,678,039 B2                                              Page 1 of 1
DATED         : January 13, 2004
INVENTOR(S)   : Edoardo Charbon It is certified that error appears in the above-identified patent and that said Letters Patent is hereby corrected as shown below:

Drawings,
Sheet 5, FIG. 5A is changed as follows:
--

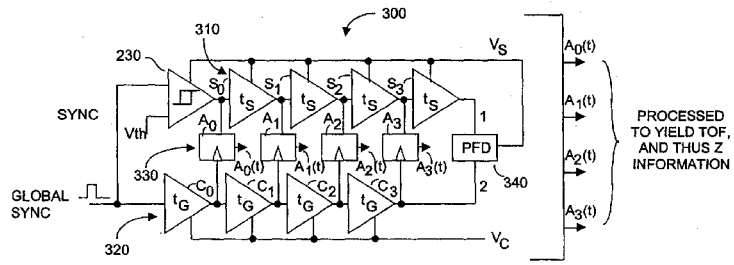

FIG. 5A                                                                      --

Signed and Sealed this

Twenty-fourth Day of August, 2004

JON W. DUDAS
*Director of the United States Patent and Trademark Office*

UNITED STATES PATENT AND TRADEMARK OFFICE
CERTIFICATE OF CORRECTION

PATENT NO.    : 6,678,039 B2                                          Page 1 of 1
DATED         : January 13, 2004
INVENTOR(S)   : Edoardo Charbon It is certified that error appears in the above-identified patent and that said Letters Patent is hereby corrected as shown below:

Drawings,
Sheet 5 of 6, FIG. 5A is changed as follows:

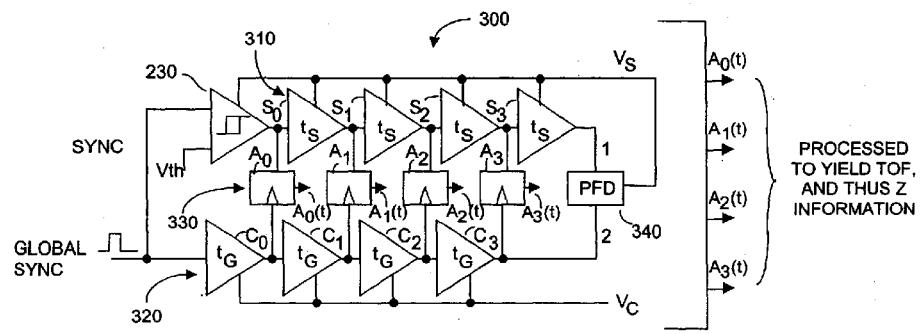

FIG. 5A

Signed and Sealed this

Twenty-first Day of September, 2004

JON W. DUDAS
*Director of the United States Patent and Trademark Office*